(12) United States Patent  (10) Patent No.: US 8,770,376 B2
Takens  (45) Date of Patent: Jul. 8, 2014

(54) BUFFER CONVEYOR FOR CONVEYING AND BUFFERING PRODUCTS

(75) Inventor: Jan-Willem Takens, Schagen (NL)

(73) Assignee: Specialty Conveyor B.V., Zwagg (NL)

( * ) Notice: Subject to any disclaimer, the term of this patent is extended or adjusted under 35 U.S.C. 154(b) by 552 days.

(21) Appl. No.: 13/057,456

(22) PCT Filed: Jul. 30, 2009

(86) PCT No.: PCT/NL2009/050470
§ 371 (c)(1),
(2), (4) Date: Feb. 10, 2011

(87) PCT Pub. No.: WO2010/016757
PCT Pub. Date: Feb. 11, 2010

(65) Prior Publication Data
US 2011/0132727 A1  Jun. 9, 2011

(30) Foreign Application Priority Data
Aug. 4, 2008 (NL) ..................... 1035783

(51) Int. Cl.
*B65G 1/00* (2006.01)
*B65G 47/51* (2006.01)

(52) U.S. Cl.
CPC ............... *B65G 47/5131* (2013.01); *B65G 47/5113* (2013.01)
USPC ...... 198/347.1; 198/594; 198/812; 198/347.3

(58) Field of Classification Search
USPC ......... 198/347.1, 347.2, 347.3, 594, 812, 778
See application file for complete search history.

(56) References Cited

U.S. PATENT DOCUMENTS

| 2,881,897 | A | * | 4/1959 | Thulke | 198/637 |
| 4,925,003 | A | * | 5/1990 | Limoni | 198/452 |
| 5,413,213 | A | | 5/1995 | Golz et al. | |
| 5,490,589 | A | * | 2/1996 | Golz et al. | 198/444 |
| 5,833,045 | A | * | 11/1998 | Osti et al. | 198/444 |
| 6,016,904 | A | * | 1/2000 | Hammock et al. | 198/812 |
| 6,152,291 | A | | 11/2000 | Steeber et al. | |

(Continued)

FOREIGN PATENT DOCUMENTS

DE  102006012148  9/2007
EP  1840725 A2  10/2007

(Continued)

OTHER PUBLICATIONS

Search Report for International Application No. PCT/NL2009/050470, dated Sep. 21, 2009.

(Continued)

*Primary Examiner* — William R Harp
(74) *Attorney, Agent, or Firm* — Westman, Champlin & Koehler, P.A.

(57) ABSTRACT

A buffer conveyor for conveying and buffering products, comprising at least a first elongated conveyor (7), which can be driven in a first direction, a second elongated conveyor (8), which can be driven in a second, opposite direction, and a transfer unit (12) having an inlet end and an outlet end, wherein a transfer element of the transfer unit describes a path between the inlet end and the outlet end which makes at most a small angle with the horizontal and which extends outside the area defined by the adjacent paths of the first and the second conveyor.

19 Claims, 15 Drawing Sheets

(56) References Cited

U.S. PATENT DOCUMENTS

| | | |
|---|---|---|
| 6,612,420 B1 | 9/2003 | Hartness, III et al. |
| 6,698,581 B2 | 3/2004 | Steeber et al. |
| 7,191,896 B2 | 3/2007 | Hartness et al. |
| 7,823,718 B2 | 11/2010 | Spencer |
| 8,042,676 B2 * | 10/2011 | Balk .......................... 198/347.1 |
| 8,162,129 B2 | 4/2012 | Franz |
| 2011/0180373 A1 * | 7/2011 | Broers et al. .................. 198/607 |

FOREIGN PATENT DOCUMENTS

| | | |
|---|---|---|
| WO | 99/11547 A1 | 3/1999 |
| WO | 2005102877 A1 | 11/2005 |
| WO | 2007096028 A1 | 8/2007 |
| WO | 2007123401 A1 | 11/2007 |
| WO | 2008037686 A1 | 4/2008 |
| WO | 2008079010 A2 | 7/2008 |

OTHER PUBLICATIONS

Official Action from the Russian Patent Office from corresponding Russian Application No. 2011108273, filed Jul. 30, 2009.

Written Opinion of the International Searching Authority dated Sep. 21, 2009 for International Application No. PCT/NL2009/050470, filed Aug. 4, 2009.

\* cited by examiner

XII – XII

BUFFER CONVEYOR FOR CONVEYING AND BUFFERING PRODUCTS

BACKGROUND

The present invention relates to a buffer conveyor for conveying and buffering products according to the preamble of claim 1.

Buffer conveyors according to the prior art are known in a great many versions thereof. U.S. Pat. No. 5,413,213 shows two types of buffer conveyors. The first type is shown in FIGS. 1-4 and FIGS. 7, 8. The buffer conveyor in question comprises a single conveyor 10 belt, which winds in double helical paths from the lower end and from the upper end, with the paths from the lower end forming the first and the second conveyor. The paths from the upper end form an inoperative part of the buffer conveyor. The first conveyor blends into the second conveyor at the upper end in that the 15 conveyor belt is lifted off its guide and moves back onto the guide of the first conveyor via the transfer unit at the second conveyor. The location where the conveyor belt is lifted off its guide can be varied along the length of the first (and thus also the second) conveyor, as a result of which the buffering length 20 is varied, which is compensated in the inoperative part of the conveyor belt {a compensation loop}. A drawback of said construction is that the construction in which the conveyor belt, which is under a tensile force, is to be moved onto and off the guide construction, is complex partially on account of the 25 compensation loop that is required, whilst it is furthermore not very advantageous for technical (driving) reasons to drive one entire, long conveyor belt.

These drawbacks are eliminated in the second type of buffer 30 conveyor shown in FIGS. 5 and 6 of U.S. Pat. No. 5,413,213. In said type of buffer conveyor, two helically wound conveyor belts are nested together, so that the windings of the first and the second conveyor extend parallel to each other, one above another. The transfer unit is mounted on a column and comprises two transfer elements in the form of chain conveyors, one for removing products from the first conveyor and one for transferring products to the second conveyor. The transfer from one chain conveyor to the other chain conveyor takes place via a chute, and it will be understood that such a transfer unit can only be used with certain types of products, in this case cigarettes.

U.S. Pat. No. 6,152,291 shows yet another type of conveyor. Here, two conveyor belts are used for forming the first and the second 10 conveyor, which extend parallel to each other in the helical path. The transfer unit is guided in the space between the first conveyor and the second conveyor for transferring the products from the first conveyor to the second conveyor and for moving along the first and the second conveyor for adjusting the 15 buffering length. Said buffer conveyor has the drawback that the products are subject to an abrupt change of direction in the transfer unit. Not all products are unaffected by this. Furthermore, longer products cannot be transferred with the transfer unit.

SUMMARY

The object of the invention is to avoid the drawbacks of the known buffer conveyors and to provide a new buffer conveyor. In order to accomplish that object, the buffer conveyor according to the invention comprises the characterizing features of claim 1.

The buffer conveyor according to the invention combines all the advantages of the various types of buffer conveyors according to the invention, without exhibiting the drawbacks thereof. Since the path of the transfer unit makes at most at a small angle with the horizontal between the inlet end and the outlet end, the buffer conveyor is suitable for buffering all kinds of products.

Since the path extends outside the area defined by the adjacent paths of the first and the second conveyor, the path can be configured to make wide bends between the inlet end and the outlet end, so that abrupt changes of direction, and thus also unstable 5 or fragile products, can be prevented, whilst it is also possible to buffer long products. The first and the second conveyor and the transfer element consist of separate conveying elements, which can be optimally adapted to the circumstances.

The general inventive concept can be worked out in various ways.

The inlet end and the outlet end of the transfer unit can rotate on opposite sides of a shaft which coincides with the central axis of the helical paths of the conveyors.

The transfer unit can join the first and the second conveyor with its inlet and outlet ends at connecting positions which are staggered in the circumferential direction of the buffer conveyor, for example by more than 90° preferably about 180°, seen in top plan view. In the latter case, the inlet and outlet end are positioned diametrically opposite each other, and the products will in fact leave the transfer unit in the same direction as the direction in which they entered the transfer unit. Said at least one transfer element of the transfer unit can move in a substantially S-shaped path. The radius of curvature of the bends thereof may be about half the radius of the first and the second conveyor.

Between its inlet and outlet end, the transfer unit preferably moves along a path which makes at most at a small angle with the horizontal, which path corresponds to at least a 90° path, measured across both buffer conveyors. Seen in top plan view, said path extends along more than 90° of the circumferential direction of the conveyors.

The inlet and outlet ends of the transfer unit can join the first and the second conveyor, respectively, in lateral direction and be provided with deflecting means at the connecting location for transferring the products from the conveyor to the transfer element and vice versa. Such a manner of transferring can be utilized for products suitable for being deflected, such as bottles, for example.

On the other hand it is possible to have the inlet end and/or the outlet end join the first conveyor and the second conveyor, respectively, in upward direction. Such a transfer can be utilized for more stable products, which are not easily deflected but which are capable of bridging a difference in height, such as books or magazines. It is conceivable to use a combination of different connections at the inlet and outlet ends.

The first and the second conveyor may extend in side-by-side, parallel relationship in the aforesaid path, with the windings of the first and the second conveyor being arranged with a difference in height between them. This is necessary because the transfer element of the transfer unit must cross one of the conveyors in order to join the other conveyor. The difference in height between the adjacent conveyors in that case enables the conveyor belt of the transfer unit to join the buffer conveyor at the same height so as to ensure a smooth product transfer. In another embodiment of the buffer conveyor, the first and the second conveyor can extend one above the other, in parallel relationship, in the aforesaid path. The transfer unit need not cross one of the conveyors in that case.

The transfer unit may be configured in many ways.

In a first embodiment, said at least one transfer element comprises an endless conveyor belt having a conveying portion and a return portion which either join each other via pulleys and extend above each other, or join each other in horizontal direction and move along different paths. The first possibility provides the simplest construction, whilst in the case of the second version the overall height of the transfer unit can remain small, in particular at the inlet end and the discharge end, which is advantageous in particular in crossing one or more conveyors.

For products which are unstable but which are suitable for being clamped, a transfer unit can be used in which said at least one transfer element comprises two endless conveying elements, which extend substantially parallel to each other, with a predetermined spacing between them, in the path between the inlet end and the discharge end, and which transport the products, preferably clampingly, between them.

The buffer conveyor may also be designed so that products can be transported in suspended condition, which can be realized by arranging both the transfer element and the first and second conveyor for suspended transport.

The first and the second conveyor may be arranged for conveying a multitude of products which extend radially relative to each other, with the transfer unit being arranged for transferring products from the first conveyor to the second conveyor. The conveyors can for example hold two products side by side in that case, with the transfer unit being arranged for transferring the products in rows of two. The buffering capacity can thus be increased. It is also possible to convey different types of products in different paths, or radial positions.

The invention further relates to a buffer conveyor for conveying and buffering products, comprising at least a first elongated conveyor, which can be driven in a first arced path in a first direction and which has an inlet end, a second elongated conveyor, which can be driven in the opposite direction in a second arced path having the same diameter and which has a discharge end, a transfer unit having an inlet end and an discharge end, which are movable at least substantially parallel to the first and the second conveyor in the aforesaid path, which transfer unit is provided with at least one separate, drivable transfer element for transferring the products from the first conveyor to the second conveyor, so that the products can be transferred from the inlet end of the first conveyor to the discharge end of the second conveyor via the transfer unit, which transfer unit comprises a drive unit for moving the transfer unit along the paths of the respective conveyors with its ends, preferably in dependence on the speeds of the first and the second conveyor, wherein the inlet end and the outlet end of the transfer element of the transfer unit join the first and the second conveyor, respectively, from the inner radius of the arced paths, and wherein the path of said at least one transfer element of the transfer unit makes at most a small angle with the horizontal between said inlet end and said outlet end.

Preferably, at least one of said first or said second conveyor is disc-shaped. Said disc may serve as a buffer in that case. The disc-shaped conveyor may be configured as an at least substantially flat rotary disc. It is also possible, however, to provide a conveyor which describes an at least substantially circular path. It should furthermore be noted that although mention is made in this connection of an inlet end and an outlet end of a disc-shaped conveyor, the terms "inlet end" and "outlet end" are to be interpreted as being the points on the disc-shaped conveyor where the products are placed on the conveyor and removed therefrom, respectively. Suitable supply and discharge conveyors and guides may to that end be provided. At the inlet side and the discharge side, the disc-shaped buffer conveyor preferably comprises at least one guide arranged for moving the products in radial direction on the disc-shaped conveyor. Preferably, a guide is mounted on the transfer unit. Furthermore preferably, at least one guide is provided, which guide is movable between the inoperative position and the operative position, in which operative position the guide moves products onto the conveyors and in which inoperative position the guide extends out of reach of the products and the transfer unit. In this way a spiral shape of products can be created on the disc-shaped conveyor in order to thus increase the buffering capacity.

The number of movable guides depends on the number of windings of the spiral shape in which the products are arranged. In another embodiment, the inlet end and the discharge end of a disc-shaped conveyor are both provided with radially adjustable guides. Both the transfer unit and the inlet end or the discharge end of a conveyor may be provided with a guide in that case.

According to said preferred embodiment, both the first conveyor and the second conveyor are disc-shaped, with the first and the second conveyor extending at least substantially parallel to each other. This leads to a compact construction providing a high buffering capacity.

Further aspects and advantages of the buffer conveyor according to the invention will become apparent from the following description, in which reference is made to the drawings, which are very schematic representations of embodiments of the invention.

DETAILED DESCRIPTION

Figure 1:
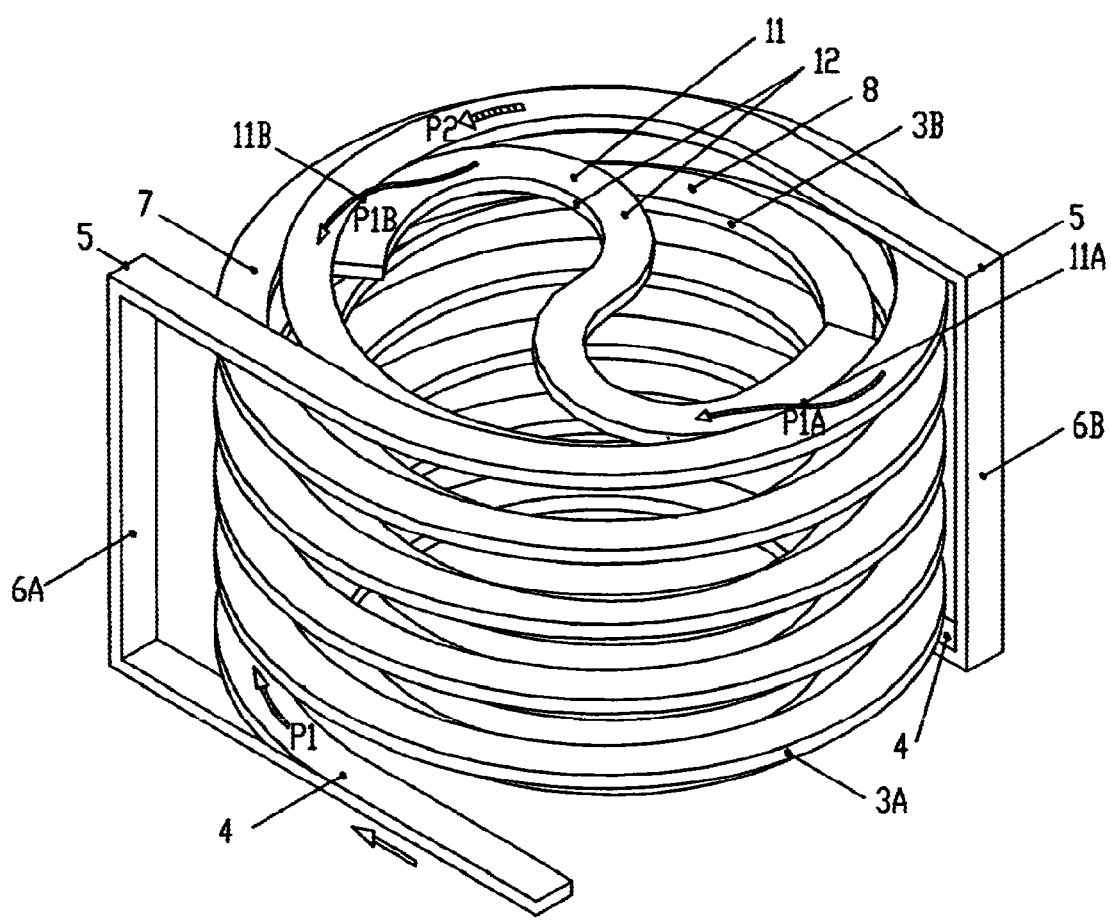
FIG. 1 is a (perspective) view of a first embodiment of the buffer conveyor according to the invention.
Figure 1A:
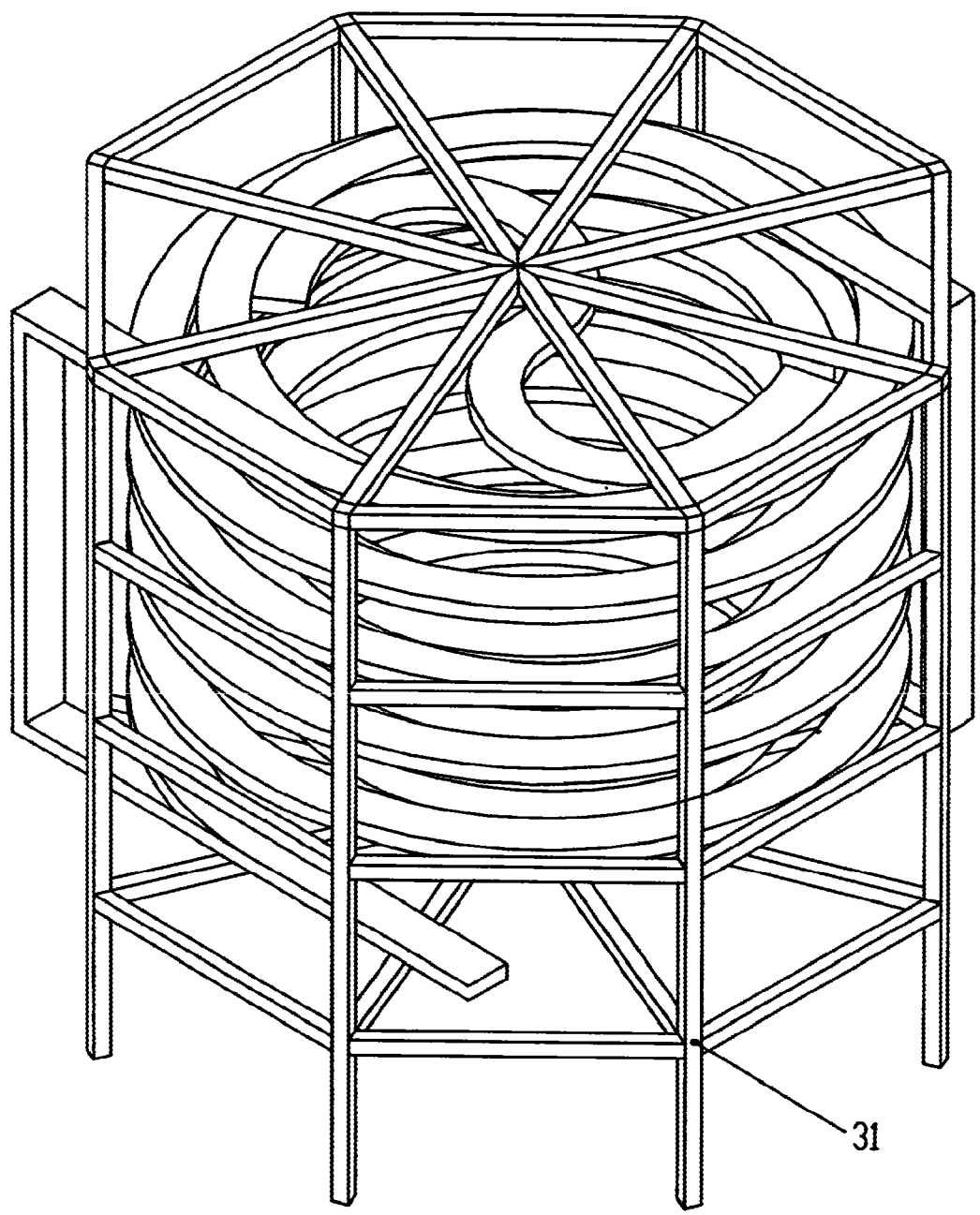
FIG. 1A is a (perspective) view of a first embodiment of the buffer conveyor disposed in a frame.

The drawings show a buffer conveyor for conveying and buffering products. Such buffering in general takes place in a production line in which the products are subjected to different processing or treatment steps at different locations and in which temporary differences in the processing rates must be compensated at said locations. The products may consist of containers, for example, in particular containers such as bottles, cans, pots, cartons and the like, but also a variety of other parcel goods; such as books, magazines, cigarettes, boxes, cases or the like are conceivable. In the case of bottles or cartons, the processing line will consist of a filling line for filling the containers in question, such as a bottling line for filling the bottles with a beverage.

The buffer conveyor may for example be disposed between a depalletising station and a washing and/or filling station, between the filling station and a labeling station or between the labeling station and a packaging station. Other applications are also conceivable, of course.

The illustrated buffer conveyor comprises an external frame 31 and helical guide chutes 3A, 3B, which are disposed within the frame and attached thereto. Also all kinds of other frame constructions are conceivable, of course. End rollers are provided at the inlet and the outlet of the conveyor, and return chutes 6A and 68 of the frame extend from the upper end of the helical guide chutes 3A, 3B. In this embodiment of the buffer 5 conveyor according to the invention, the guide chutes 3A, 3B and the return chutes 6A, 68 support a first elongated conveyor 7 and a second elongated conveyor 8, respectively, which may each comprise one or more conveyor belts or the like, for example, which extend beside each other. The conveying portion and the return portion of the two conveyors 7, 8 moves along different paths. Is also conceivable to use an embodiment in which the return portion is led along the underside of the guide chute 3A, 38 for the conveying portion. Various embodiments of the first and the second conveyor 7, 8 are possible, whilst it is preferable in the case of belt conveyors that a more or less closed conveying surface is obtained. Examples of such belt conveyors are slat conveyors, link conveyors, stainless steel slat chain conveyors, textile belt conveyors, PVC belt conveyors, steel belt conveyors and the like, which latter types are generally only suitable for use in a straight, i.e. non-curvilinear conveyor. The invention also extends to rectilinear conveyors, however, to conveyors which are only curved in a horizontal plane, to conveyors which (also) extend in vertical direction, to suspended conveyors and to conveyors not configured as endless conveyors but, for example, as a roller conveyor or as an air conveyor or a magnetic conveyor.

In the embodiment that is shown in FIG. 1, the helical chutes 3 comprise 5 windings, but it is also possible to use a larger or a smaller number of windings, depending on the application in question. For example, the use of guide rollers on the conveyor belts of the conveyors 7, 8 makes it possible to drive the conveyor belts over a large number of windings without any driving problem.

The two conveyors 7, 8 each have their own driving motor, which motors are mounted near the upper end 5 in this case, and which drive the associated conveyor 7, 8. The two conveyors may also be connected to supplying or discharging conveyors, in which case they are driven and controlled by said conveyors, therefore.

The two conveyors 7, 8 can be driven independently of each other, in this case in opposite directions, i.e. products are conveyed upwards over the conveying surface of the first conveyor belt 7 from an inlet end at the lower end 4, as indicated by the arrow PI, and downwards again over the conveying surface of the second conveyor 8 (see the arrow P2) towards a discharge end at the lower end 4. At the location indicated by the arrow P1 the products are transferred from the conveying surface of the first conveyor 7 to an inlet end 11A of a transfer element, in this case a transfer belt 11 of a transfer unit 12, whilst the products are transferred from the outlet end 11B of the transfer belt 11 to the conveying surface of the second conveyor belt 8 at the location indicated by the arrow P1B. It would also be possible, of course, for the transport to take place from the top to the bottom and subsequently up again, if the application should require so.

The transfer unit 1 is movable within the buffer conveyor, in this case being guided and supported in the space radially inwards of the conveyors 7, B. The transfer unit extends outside the area defined by the adjacent paths of the first and the second conveyor 7, 8. Seen in top plan view, said area is defined by the inner radius of the first, outer conveyor 7 and the outer radius of the second, inner conveyor 8 in this embodiment.

The position of the transfer unit 12 depends on the required buffering capacity between the inlet end and the discharge end of the buffer conveyor. If the supply rate of the first conveyor 7 is higher than the discharge rate of the second conveyor 8, the excess of products being supplied must be buffered in the buffer conveyor and the transfer unit 12 must move away from the inlet end of the buffer conveyor in that case so as to collect more 5 products on the buffer conveyor. If in another case the speed of the supplying first conveyor 7 is lower than the speed of the discharging second conveyor 8, the transfer unit 12 must move in the direction of the discharge end so as to supply buffered products to the discharge end. In practice the buffer conveyor 10 is for example capable of buffering a number of products which suffices for 5-15 minutes of buffering time, for example, which period of time generally suffices for restoring the balance between the supply rate and the discharge rate. In fact the transfer unit acts to shift the transition between an active part 15 and an inoperative part of the conveyors 7, 8, so that the length of the active part of the conveyors can be adapted to the circumstances.

In the example as shown, the transfer unit 12 rotates about a shaft 20 while the buffering length is being changed, which shaft coincides with the central axis of the helical paths of the conveyors 7, 8. The transfer unit will also have to move along the shaft in order to follow the change in height of the helix.

In the illustrated embodiment, the transfer belt 11 of the transfer unit 12 has a conveying path which extends substantially in the shape of an S between the inlet end 11A and the discharge end 11B. In this case the transfer between the transfer belt 11 and the conveyors 7, 8 is effected by deflecting guides 13 (FIG. 30 2), which are either active or passive. In the former case, the deflecting guides will be driven and actively transfer the products supplementary to the conveying force being exerted by the conveyors 7, 8 and the driven transfer belt 11. In this case the transfer element joins the conveyors 7, 8 with its inlet and outlet end 11A, 11B, respectively, at the inner radius in each case.

In this embodiment, a return portion 14 of the endless transfer belt 11 moves along a different path than the conveying portion and in fact continuously connects to the inlet and outlet ends 11A, 11B of the transfer belt 11. This has the advantage of realizing a small overall height of the transfer belt 11 at the inlet end, which is important with a view to ensuring a smooth transfer of the products at the same height. After all, the transfer belt 11 must cross the second conveyor 8 at the inlet end 11A in order to join the first conveyor 8. In this embodiment, this means that the windings of the first and the second conveyor 7, 8 must be staggered in vertical direction relative to each other so as to ensure an easy crossing of the second conveyor. Sufficient space must be available between the underlying winding of the second conveyor 8 and the upper side of the conveyor 7 for allowing the transfer unit 12 to pass and have the transfer belt 11 join the conveyor 7 at the same height.

Both the first and second conveyors 7, 8 and the transfer belt 11 may be provided with lateral guides at their outer radius to prevent products falling off sideways. Especially when higher speeds are used, the centrifugal force can force products outwards, so that a lateral guide is necessary in order to keep the products on the conveyor.

Depending on the difference in height between the windings of the first and the second conveyor, the pitch of the windings and the location of the inlet and outlet ends, the inlet end and the outlet end will or will not be positioned at the same height. If they are positioned at the same height, the path of the transfer belt can extend horizontally, but in the case of a difference in height the path will extend at most at a small angle (usually an angle smaller than the pitch angle of the first and the second conveyor) on account of the relatively great length of the transfer belt, so that this will not cause any problems when products are being transferred.

Figure 2:
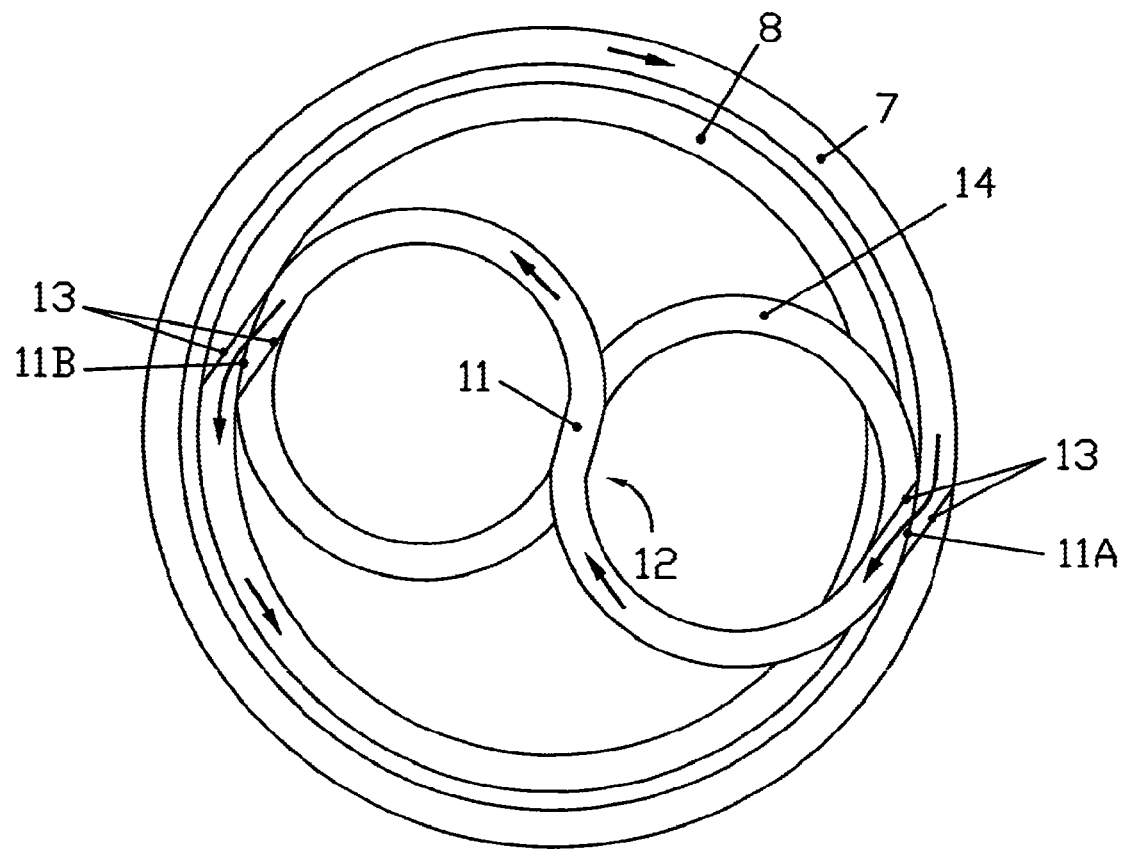
FIG. 2 is a schematic top plan view of a variant of the transfer unit and the adjoining parts of the first and the second conveyor of the buffer conveyor of FIG. 1.
Figure 3:
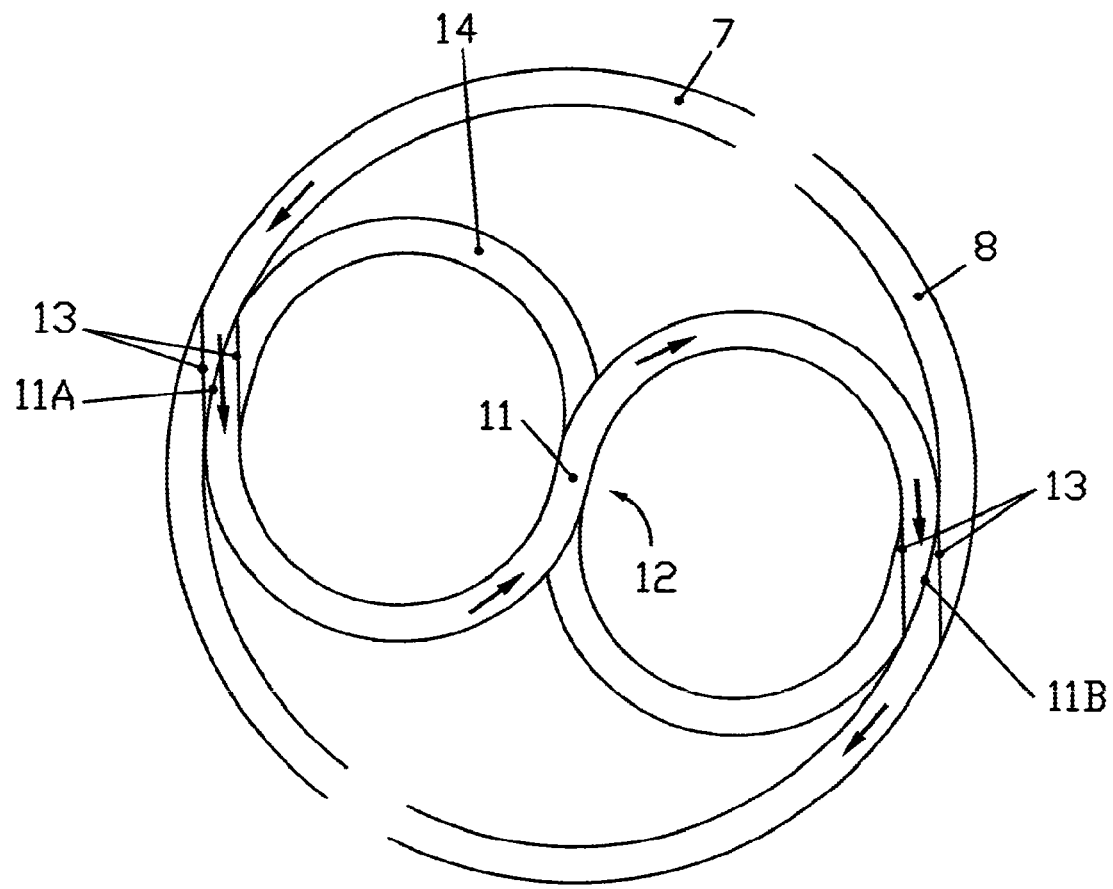
FIGS. 3-5 are views corresponding to FIG. 2 of further embodiments of the buffer conveyor according to the invention.

FIG. 3 shows a variant of the embodiment of FIGS. 1 and 2, in which the first and the second conveyor 7, 8 do not extend in side-by side, parallel relationship but one above the other, and consequently have the same diameter in the helical path. The spirals of the conveyors 7, 8 are thus nested together, as it were. Seen in top plan view, the area defined by the conveyors is located between the inner and the outer radius of the two conveyors 7, 8 in this variant. In this case the path of the transfer element 11 of the transfer unit 12 can extend horizontally at all times, because the inlet end 11A adjacent to the first conveyor 7 is positioned at the same height as the outlet end 11B at the second conveyor 8, half a winding further. In this case the transfer unit need not cross a conveyor, whilst the buffering length will be maximal with a given external diameter of the buffer conveyor. The construction of this embodiment is simpler than that shown in FIG. 2.

Figure 4:
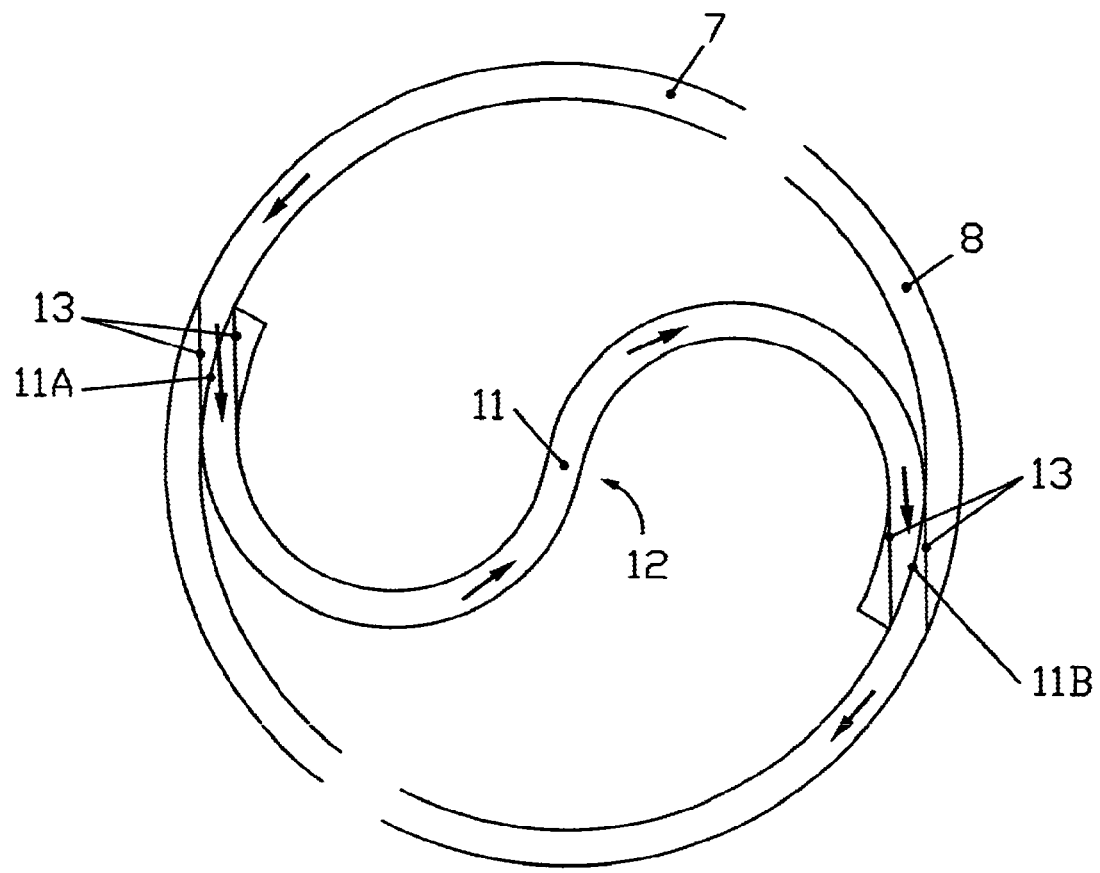

The embodiment according to FIG. 4 shows a transfer unit 12 whose transfer element is made up of a transfer belt 11 again. Said transfer belt 11 has a conveying portion and a return portion which move along the same path, however, with the return portion extending under the S-shaped part of the products, therefore. In this case the transfer unit 12 is combined with a nested version of the conveyors 7, 8, with the transfer belt 11 joining the first conveyor 7 and the second conveyor 8 in lateral direction and use being made of deflecting guides 13. Because the transfer belt 11 does not cross a conveyor 8, the greater overall height of the transfer unit 12 is not limited by the difference in height between the two conveyors. This buffer conveyor is of relatively simple construction.

Figure 5:
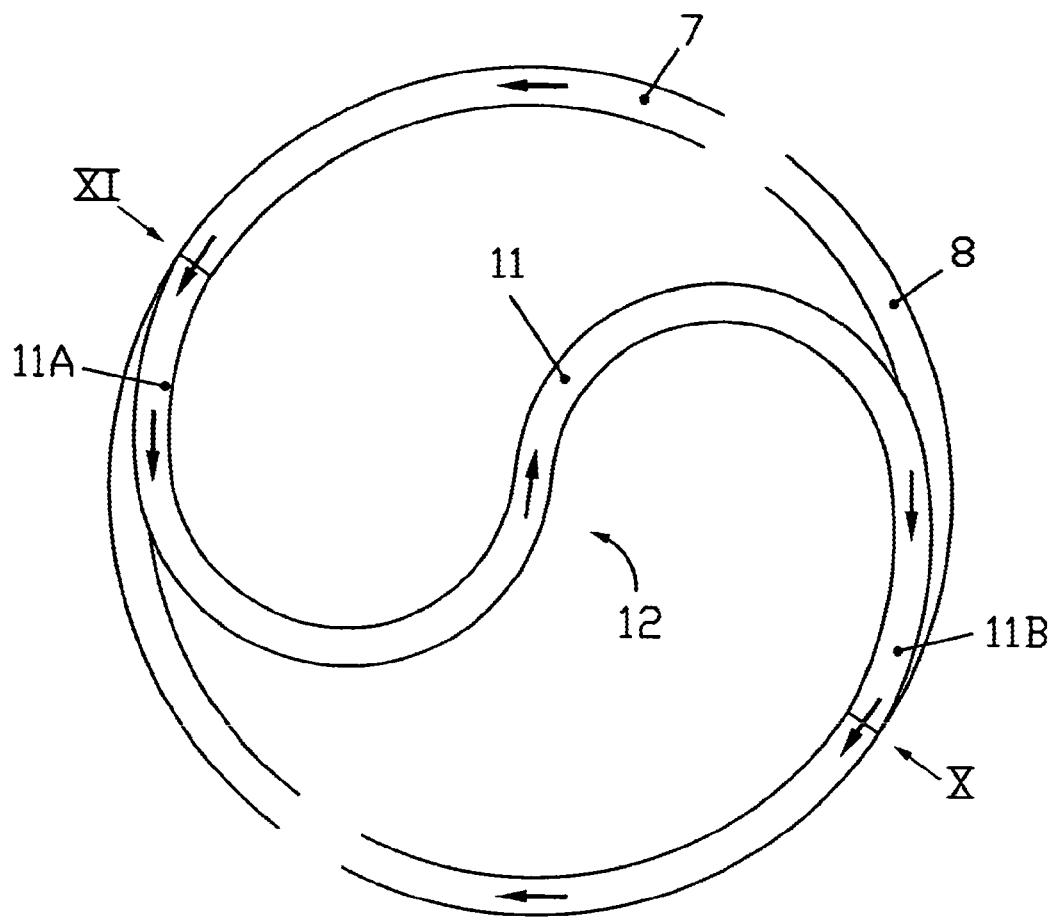

FIG. 5 shows another embodiment, which is comparable to the embodiments of FIG. 4, but in which the transfer belt 11 does not join the first conveyor belt 7 and the second conveyor belt 8 in lateral direction at the inlet end 11A and the outlet end 11B, respectively, but in upward direction.

Figure 6:
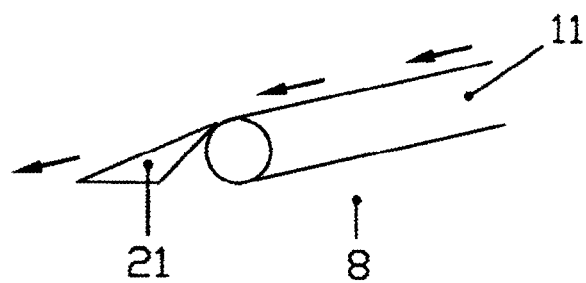
FIG. 6 is a larger-scale side view according to the arrow X in FIG. 5.

FIG. 6 shows the connection at the outlet end 11B, in which, as the figure shows, the transfer belt 11 joins the conveying surface of the second conveyor via a guide plate 21. It stands to reason that there are other ways of effecting the transfer between the transfer belt 11 and the second conveyor 8. The end roller of the transfer belt 11 may have a minimal dimension, but products may also be easily capable of bridging a difference in height, for example in the case of books or magazines.

Figure 7:
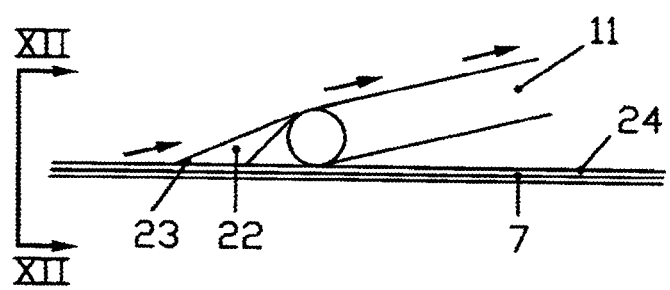
FIG. 7 is a larger-scale view according to the arrow XI in FIG. 5.
Figure 8:
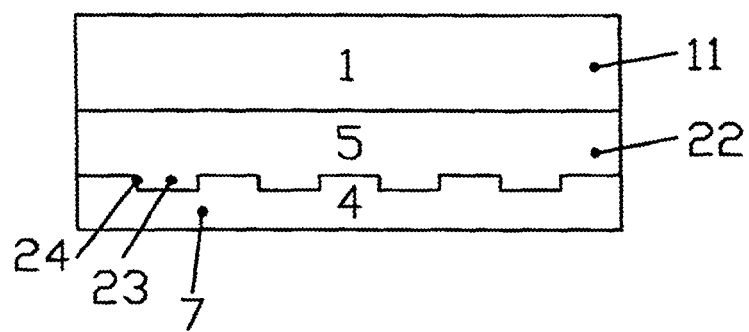
FIG. 8 is a sectional view along the line XII-XII in FIG. 7

FIGS. 7 and 8 show the situation at the inlet end 11A, in which the transfer unit 12 is provided with a rake plate 22, which bridges the difference in height between the conveying surface of the first conveyor 7 and the conveying surface of the transfer belt 11. The rake plate 22 has teeth 23, which engage in grooves 24 in the conveying surface of the first conveyor belt 7, so that products can transfer from the conveying surface of the first conveyor 7 to the rake plate 22 without having to pass a threshold. Under the influence of their own speed or the pushing force exerted by products arriving behind them, the products will move over the rake plate 22 and onto the transfer belt 11, which will carry the products onwards. If products which are not able to endure a pushing force or which must remain apart are to be transferred, it is also possible to use a transfer element having a number of narrow, parallel conveyor belts, straps or the like which form a fork at the end, the teeth of which fork can extend into openings in the first conveyor 7, which will likewise consist of a number of parallel conveyor belts or the like.

Figure 9:
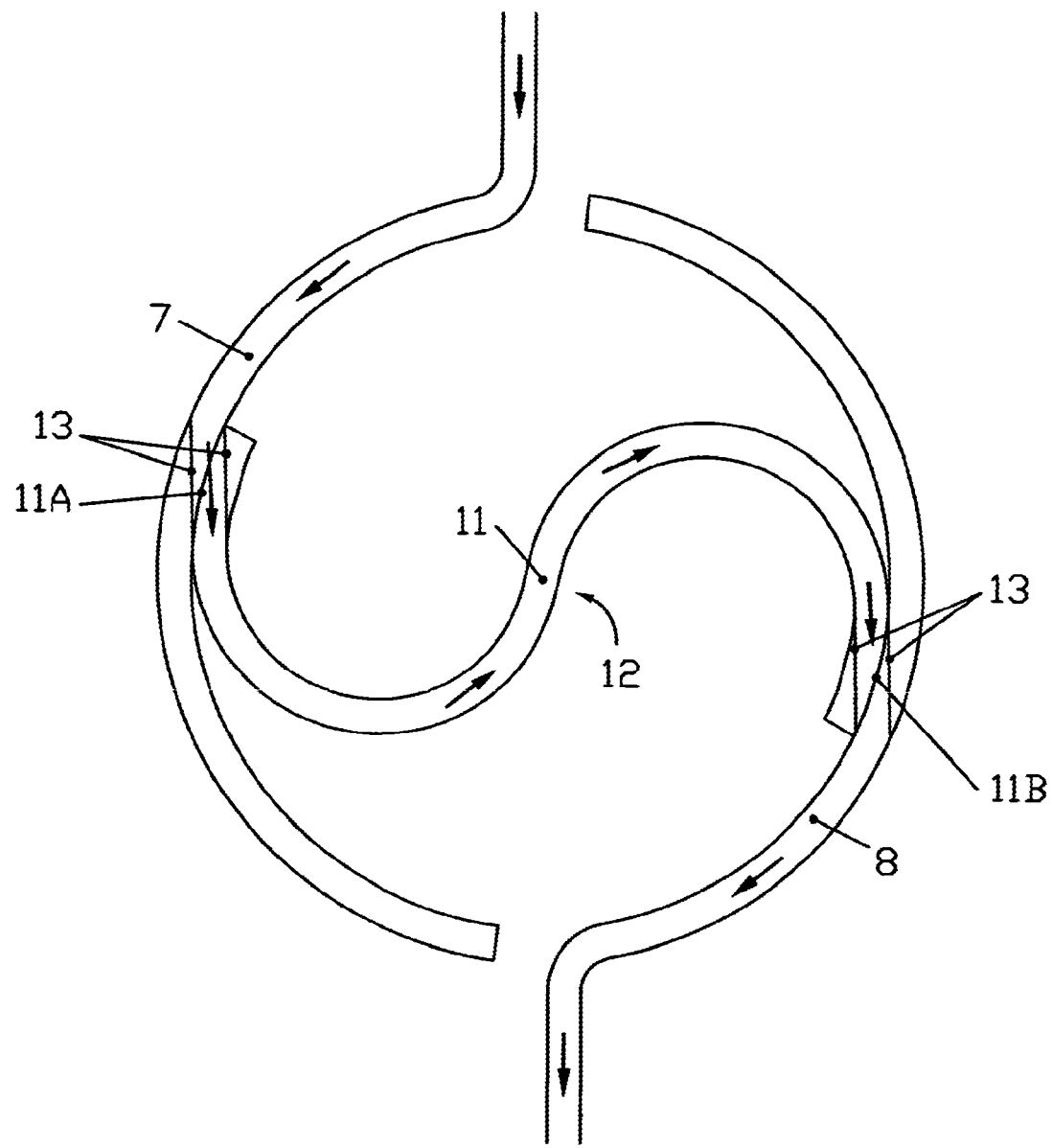
FIG. 9 is a view corresponding to FIG. 2 of yet another embodiment of the buffer conveyor according to the invention.

The embodiment shown in FIG. 9 is different from the preceding embodiments in that the conveyors 7, 8 do not describe a helical path but only a horizontal arced path. The transfer unit 12 and 10 the transfer element are comparable to those shown in FIG. 4, with the inlet end 11A and the outlet end 11B of the transfer belt 11 of the transfer unit 12 joining the first and the second conveyor 7 and 8, respectively, from the inner radius of the arced paths, and the path of said at least one transfer element of the transfer 15 unit at most making a small angle with the horizontal between the inlet end and the outlet end, in this case extending horizontally. The conveyors 7, 8 do not extend parallel to each other in this embodiment, but they extend in line with each other in an arced path, having the same centre of curvature and, in this case, also the same radius of curvature. The transfer unit 12 has the same function in this embodiment, in which connection it is noted, however, that only a very limited buffering capacity can be realized, of course, so that this embodiment can only be used when a very small buffering capacity is required. It would also be possible to have the conveyors 7, 8 extend at different levels or to arrange said conveyors entirely or partially above each other. The only difference with the preceding embodiments is that the conveyors do not extend in a helical but in a horizontal path. The transfer unit 12 could also join the conveying surface of the 30 conveyors 7, 8 in vertical direction with its inlet and outlet ends, as long as the transfer unit arrives at or departs from the inner radius.

Figure 9A:
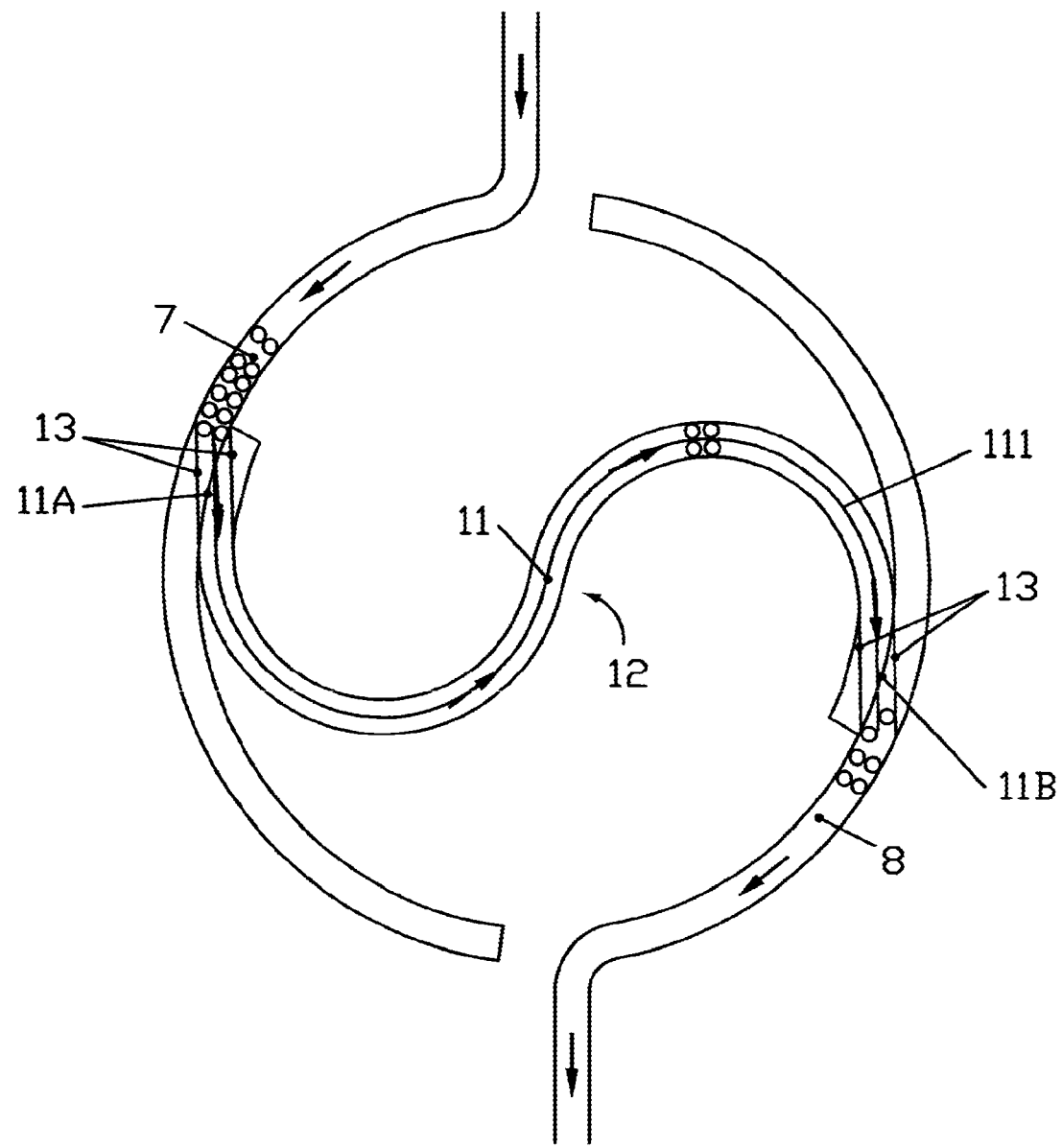
FIG. 9a shows a variant of the embodiment of FIG. 9.

FIG. 9a shows a variant in which the first and the second conveyor 7, 8 are arranged for holding products in rows of two. The products are preferably placed a radial distance apart. It will be understood that in other embodiments several products disposed beside each other or, in other words, several products extending radially relative to each other, can be held on the conveyors. In this embodiment, the transfer unit 12, too, is arranged for transferring the products from the first conveyor 7 to the second conveyor 8 in rows of two. The transfer unit 12 is to that end provided with a central guide 111 for guiding the products. If a plurality of products is to be held beside each other, a plurality of central guides may be provided. It should be noted that the possibility of holding several rows of products is not restricted to the embodiment of FIG. 9, but that it also 15 can be used in other embodiments. It may also be possible to hold different types of products in different paths.

Figure 10:
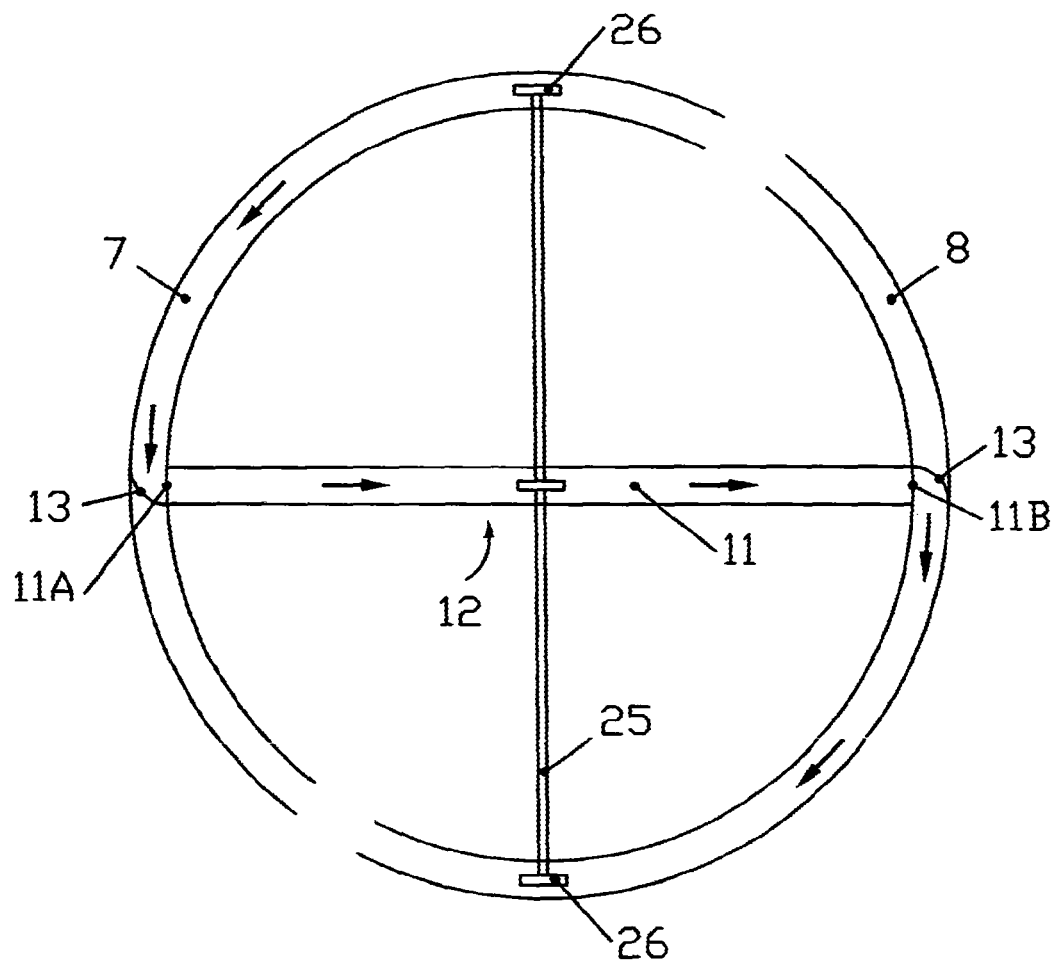
FIG. 10 is a view comparable to the view of FIG. 2, showing a manner of supporting the transfer unit and/or driving the transfer element.

FIG. 10 very schematically shows possibilities for driving the transfer unit 12 and the transfer element.

In the embodiment of FIG. 10, the transfer unit 12 is provided with a drive shaft 25, which rigidly connects two wheels 26 at the ends thereof. Said wheels are in engagement with the first and the second conveyor 7, 8, respectively, which move in the same direction at diametrically opposite locations. If the two conveyors 7, 8 move at the same speed, the wheels will rotate at the same speed in the same direction, therefore, so that the drive shaft 25 will not experience any force about the axis of rotation of the transfer unit 12 and the transfer unit 12 will remain stationary. Once the conveyors 7, 8 start to move at different speeds, the drive shaft 25 will start to rotate in anti-clockwise or clockwise direction, carrying along the transfer unit 12, so that the buffering length is changed. The wheels 26 may be drivingly connected to the conveyor 7, 8 through friction or via teeth or the like. The wheels 26 may also be rigidly connected in a different manner, for example via two coupled shafts, which may or may not extend at an angle relative to each other, so that the same effect is achieved. The shaft 26, which rotates about its own axis, can also be utilized for driving the transfer element, which may for example be configured as a transfer belt, for example via a sprocket wheel which is mounted under the transfer belt 11 for driving the same and which is connected to the drive shaft 25 via a chain.

Further driving variants are conceivable, of course, a central shaft about which the transfer unit 12 rotates and which coincides with the central axis of the helical paths of the conveyors 7, 15 8. In addition to taking off the rotation of the transfer unit 12 by mechanical means, this can also be realized by using electronic control means. The central shaft can be driven by means of a differential drive mechanism on the basis of the speeds of the conveyors 7, 8. Said differential drive can be effected by electronic means, by measuring the speeds of the conveyors 7, 8 and calculating the required rotational speed of the central shaft on the basis thereof, of by mechanical means, by taking off the movement of the conveyors 7, 8 and coupling the conveyors 7, 8 to the central shaft via a differential system. Under the control of the differential drive mechanism, the transfer unit 12 moves along with the faster moving conveyor.

Figure 11A:
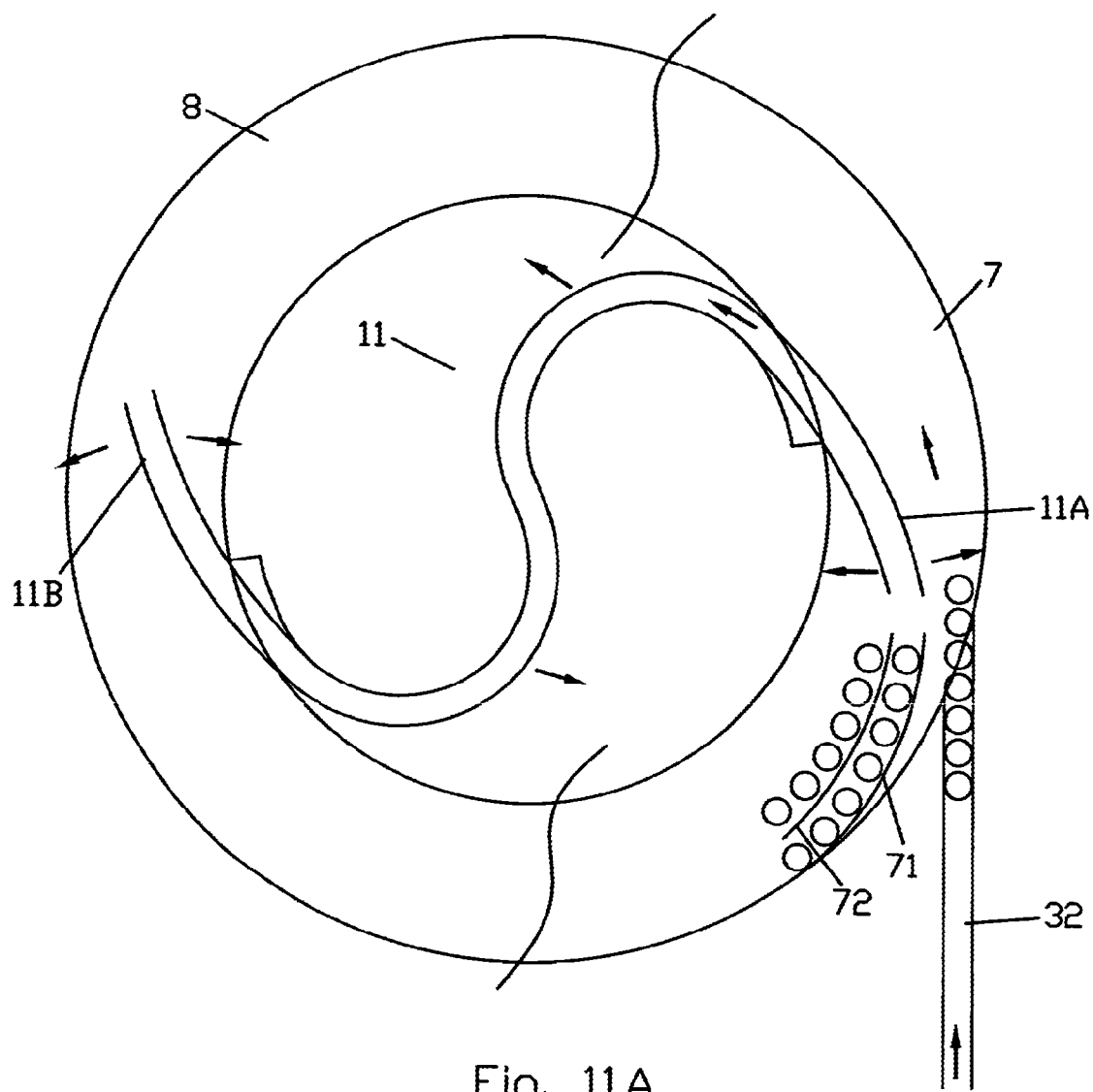
FIGS. 11A and 11B are top plan views of a variant of the buffer conveyor of FIG. 11.
Figure 11B:
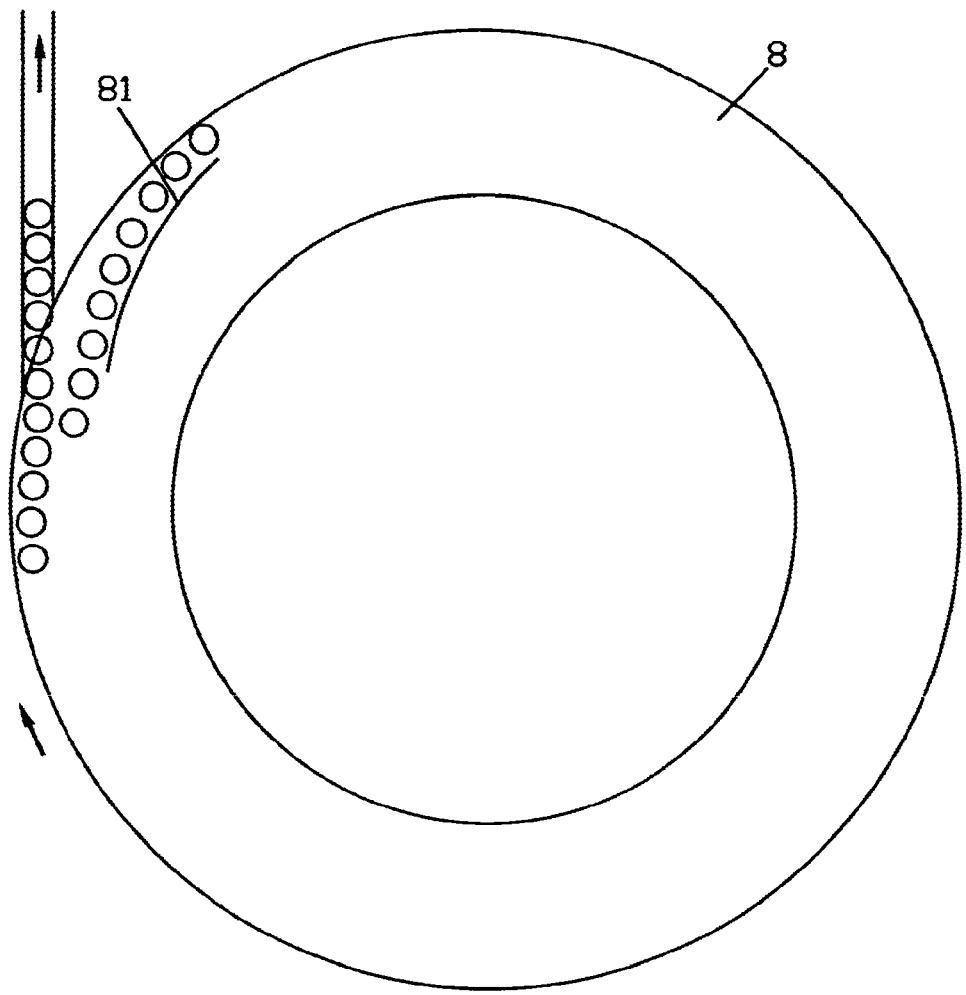

FIGS. 11a and 11b show another variant, FIG. 11a showing the first conveyor 7 and FIG. 11b showing the second conveyor 8. The conveyors 7 and 8 are arranged one above the other. Between said conveyors 7 and 8 the transfer unit 11 according to the invention extends.

Products are supplied to the first disc-shaped conveyor 7 via a supply conveyor 32. The products are placed at the outer radius of the disc 7. If accumulation is not desired, the products will be directly transferred to the second conveyor 8 by the transfer unit 11. The transfer unit is to that end provided with a guide in the form of a deflection element 11a. The deflection element 11a can be set to take up products from a random radial position as indicated by the arrows.

If accumulation takes place, the guide 11A will have shifted exactly one track radially inwards after 360° rotation. After the 15 transfer unit 11 and the guide 11A have passed, the guide 71 will be activated. If further accumulation is to take place, the guide 71 will shift the products one track inwards, after which the products will be handled by the deflection element 11a of the transfer unit 11. If the buffering capacity is to be further increased, another guide 72 can be activated, by means of which the products can be shifted another track on the disc 7. The transfer unit 11 and the deflection element 11a thereof will move along correspondingly.

In FIG. 11B the second disc 8 is shown. If no accumulation takes place, the transfer unit 11 will deposit the products at the outer radius by means of the deflection element 11B, see FIG. 11A, where upon the products 11B discharged via the discharge conveyor 33. Also in this case it is possible for the deflection element 11B to place the products at a different radial position in order to position the products on a second track. A guide 81 is used for subsequently moving the products present on said second track to the first track for discharging said products. The guide 81 is moved from an inoperative position to an operative position upon passage of the transfer unit 11. It will be understood that a multitude of guides 81 may be used. It is advantageous in that regard if the products are only shifted on the disc when they are 5 in contact with the guides 71 or 81. When the accumulator is being emptied, the guides 11A and 11B will move towards the outer radius of the buffer conveyors 7, 8 again.

Figure 12:
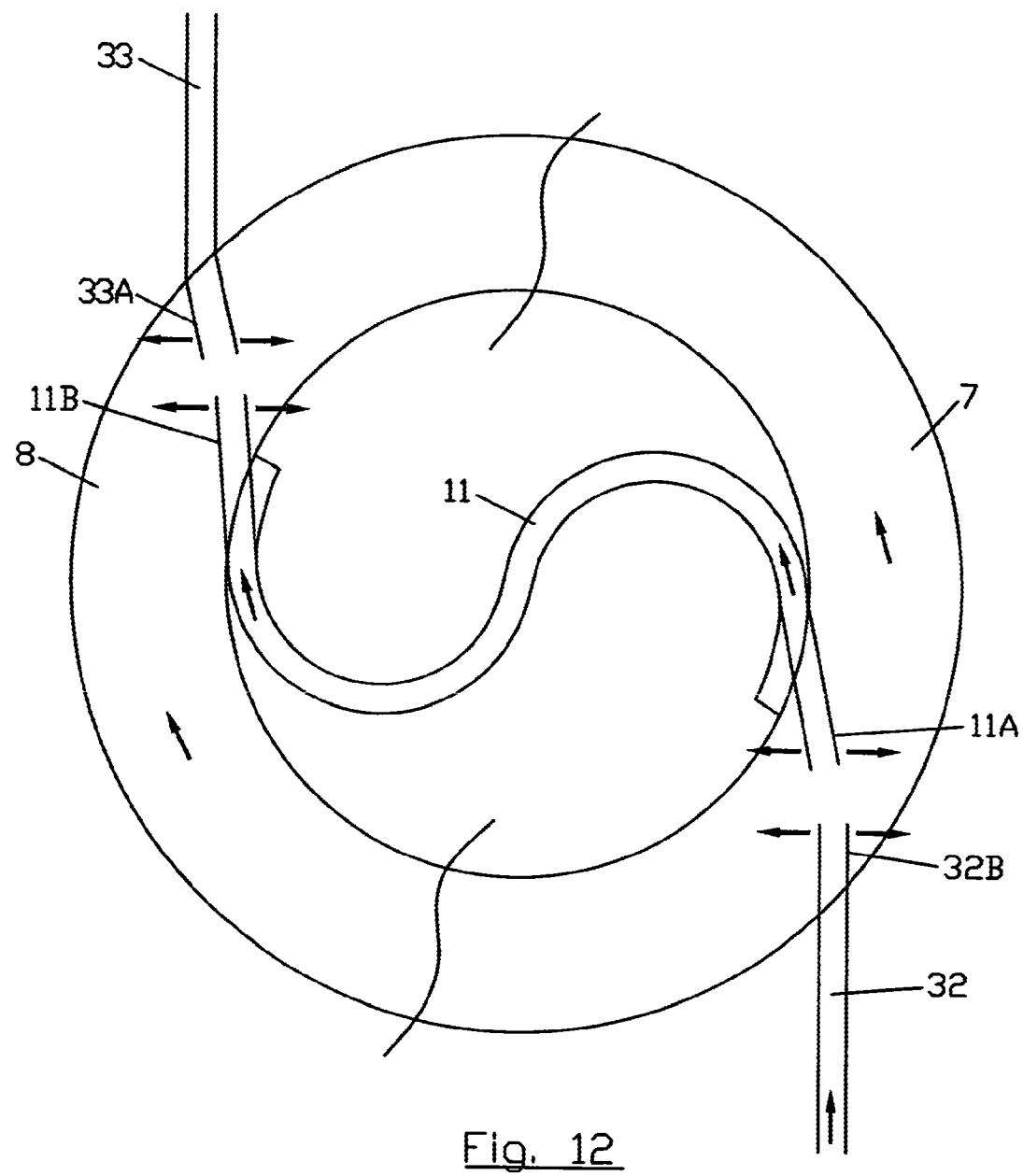
FIG. 12 is a top plan view of another embodiment of the buffer conveyor according to the invention.

FIG. 12 shows another variant of the invention. The first and the second conveyor 7, 8 are disc-shaped and extend one above the other in this embodiment. The transfer unit 11 according to the invention is arranged for transferring products from the first conveyor 7 to the second conveyor 8. The inlet side 32 is radially movable by means of the guides 32b, as indicated by the arrows.

The placement of the products onto the disc 7 from the supply conveyor 32 is thus adjustable. In this way it is possible to place the products in a spiral form on the disc 7. The inlet side 11A of the transfer unit 11, too, is movable for receiving the products from the disc 7.

Also upon placement of the products after the transfer thereof to the disc 8, a spiral of products can be formed via the movable outlet side 11B, for example in the form of a deflection element. The outlet side 33 of the second conveyor 8 is to that end also provided with a movable guide 33a.

Figure 13:
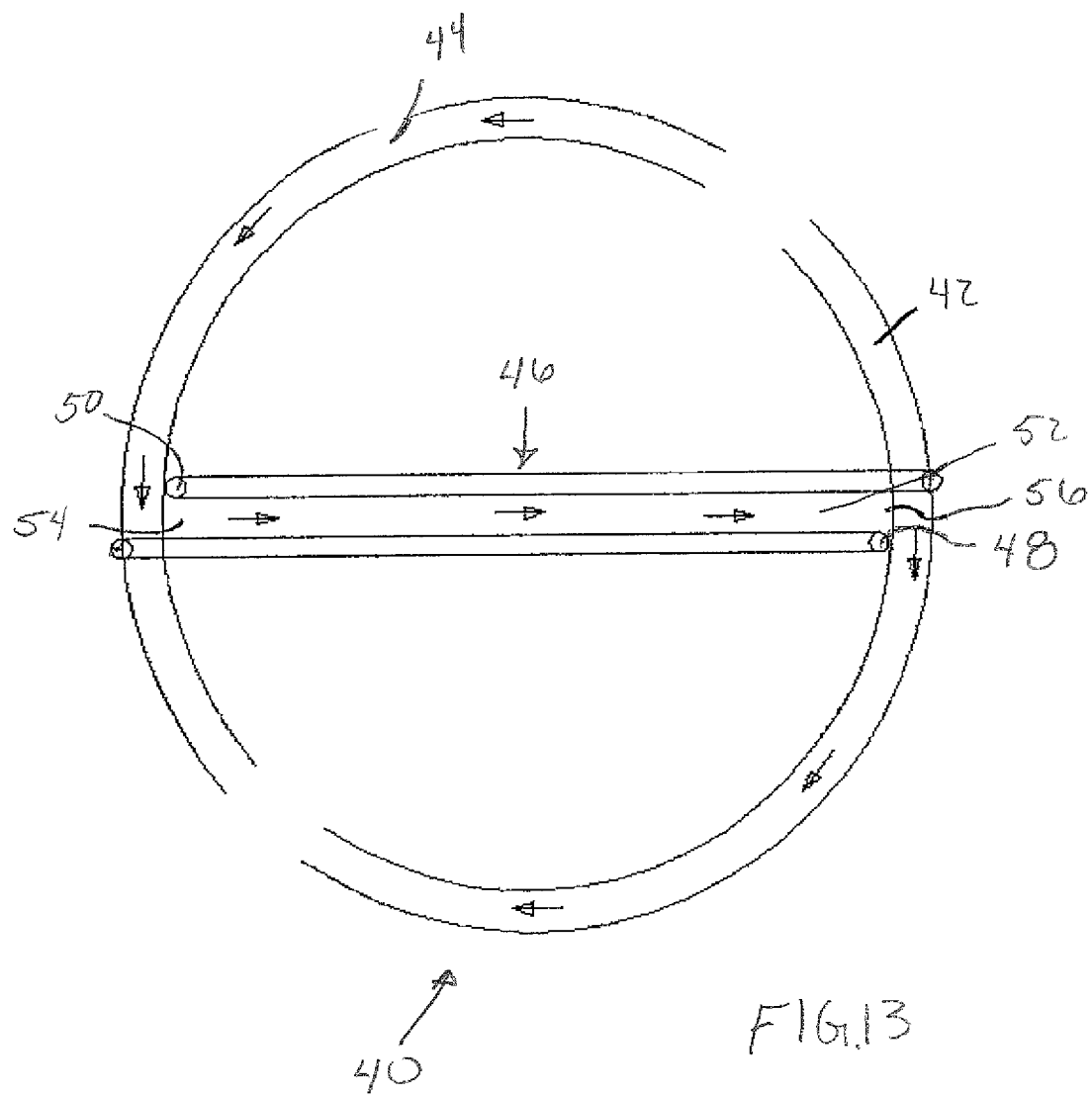
FIG. 13 is a top plan view of another embodiment of the buffer conveyor according the invention.

Referring to FIG. 13, for products which are unstable but which are suitable for being clamped, a transfer unit 40 having two conveyors 42 and 44 can be used in which said at least one transfer element 46 comprises two endless conveying elements 48 and 50, which extend substantially parallel to each other, with a predetermined spacing between them, in the path 52 between the inlet end 54 and the discharge end 56, and which transport the products, preferably clampingly, between them.

From the foregoing it will be apparent that the invention provides a buffer conveyor which stands out for the possibilities its provides for transferring all kinds of products, such that the buffer conveyor can be optimally adapted to said products through the selection and arrangement of the various parts of the buffer conveyor.

The invention is not limited to the embodiment as shown in the drawings and described in the foregoing, which can be varied in many ways within the scope of the invention as defined in the claims. Thus it is possible to combine the various embodiments, for example types of transfer unit with different arrangements of the conveyors. Thus, most transfer units of the conveyors 7, 8 describing a helical path can also be used with the flat version of the conveyors 7, 8 shown in FIG. 9.

The invention claimed is:

1. A buffer conveyor for conveying and buffering products, comprising:
   at least a first elongated conveyor, which can be driven in a first direction and which has a first inlet end,
   a second elongated conveyor, which can be driven in a second direction, opposite to the first direction and which has a first discharge end, which first and second conveyor at least partially extend in helical paths about one or more common vertical axes, at least substantially parallel to each other wherein the first conveyor includes a first inner radius and the second conveyor includes a second inner radius,
   a transfer unit having a second inlet end and a second discharge end, which are movable at least substantially parallel to the first and the second conveyor in the aforesaid path, which transfer unit is provided with at least one drivable transfer element separate from the first and second elongated conveying members, the transfer element configured to transfer the products from the first conveyor to the second conveyor, so that the products can be transferred from the first inlet end of the first conveyor to the first discharge end of the second conveyor via the transfer unit, which transfer unit comprises a drive unit configured to move the transfer unit along the paths of the respective conveyors with its ends, preferably in dependence on the speeds of the first and the second conveyor, wherein said at least one transfer element of the transfer unit describes a path between the second inlet end and the second outlet end which makes at most an angle smaller than the pitch angle of the first and the second conveyor and which extends outside the area defined by the adjacent paths of the first and the second conveyor.

2. A buffer conveyor according to claim 1, wherein the transfer unit rotates with the second inlet end and the second outlet end about a shaft which coincides with the central axis of the helical paths of the conveyors.

3. A buffer conveyor according to claim 1, wherein the transfer unit joins the first and the second conveyor with the second inlet end and the second outlet end at connecting positions which are staggered in the circumferential direction of the buffer conveyor.

4. A buffer conveyor according to claim 3, wherein said connecting positions are staggered relative to each other by more than 90° seen in top plan view.

5. A buffer conveyor according to claim 3, wherein said connecting positions are staggered relative to each other by about 180° seen in top plan view.

6. A buffer conveyor according to claim 1, wherein said at least one transfer element of the transfer unit moves in an at least S-shaped path from the second inlet end to the second outlet end.

7. A buffer conveyor according to claim 1, wherein the second inlet and outlet ends of the transfer unit join the first conveyor and the second conveyor, respectively, in lateral direction and are provided with deflecting means at the connecting location for transferring the products from the first conveyor to the transfer element and from the transfer element to the second conveyor.

8. A buffer conveyor according to claim 1, wherein the second inlet end and/or the second outlet end of the transfer unit join(s) the first conveyor and the second conveyor, respectively, in upward direction.

9. A buffer conveyor according to claim 1, wherein the first and the second conveyor extend one above the other, in parallel relationship, in said path.

10. A buffer conveyor according to claim 1, wherein said at least one transfer element comprises an endless conveyor belt having a conveying portion and a return portion which either join each other via pulleys and extend above each other, or join each other in horizontal direction and move along different paths.

11. A buffer conveyor according to claim 1, wherein both said at least one transfer element and said first and second conveyor are arranged for suspended transportation of the products.

12. A buffer conveyor according to claim 1, wherein the second inlet and the second outlet end join the first conveyor and the second conveyor from the first and second inner radii, all respectively.

13. A buffer conveyor according to claim 1, wherein the first and the second conveyor are arranged for conveying a multitude of products in the helical paths of the first and second conveyors, with the transfer unit being arranged for transferring the products from the first conveyor to the second conveyor.

14. A buffer conveyor for conveying and buffering products, comprising:

at least a first elongated conveyor, which can be driven in a first direction and which has a first inlet end, a second elongated conveyor, which can be driven in a second direction, opposite to the first direction and which has a first discharge end, which first and second conveyor at least partially extend in helical paths about one or more common vertical axes, at least substantially parallel to each other wherein the first conveyor includes a first inner radius and the second conveyor includes a second inner radius, a transfer unit having a second inlet end and a second discharge end, which are movable at least substantially parallel to the first and the second conveyor in the aforesaid path, which transfer unit is provided with at least one drivable transfer element separate from the first and second elongated conveyors, the transfer element configured to transfer the products from the first conveyor to the second conveyor, so that the products can be transferred from the first inlet end of the first conveyor to the first discharge end of the second conveyor via the transfer unit, which transfer unit comprises a drive unit configured to move the transfer unit along the paths of the respective conveyors with its ends, preferably in dependence on the speeds of the first and the second conveyor, wherein said at least one transfer element of the transfer unit describes a path between the second inlet end and the second outlet end which extends outside the area defined by the adjacent paths of the first and second conveyors, wherein the first and the second conveyor extend in side-by-side, parallel relationship in the aforesaid path, with the windings of the first and the second conveyor being arranged with a difference in height between them.

15. A buffer conveyor for conveying and buffering products, comprising:

at least a first elongated conveyor, which can be driven in a first direction and which has a first inlet end, a second elongated conveyor, which can be driven in a second direction, opposite to the first direction and which has a first discharge end, which first and second conveyor at least partially extend in helical paths about one or more common vertical axes, at least substantially parallel to each other wherein the first conveyor includes a first inner radius and the second conveyor includes a second inner radius, a transfer unit having a second inlet end and a second discharge end, which are movable at least substantially parallel to the first and the second conveyor in the aforesaid path, which transfer unit is provided with at least one drivable transfer element separate from the first and second elongated conveyors, the transfer element configured to transfer the products from the first conveyor to the second conveyor, so that the products can be transferred from the first inlet end of the first conveyor to the first discharge end of the second conveyor via the transfer unit, which transfer unit corn rises a drive unit configured to move the transfer unit along the paths of the respective conveyors with its ends, preferably in dependence on the speeds of the first and the second conveyor, wherein said at least one transfer element of the transfer unit describes a path between the second inlet end and the second outlet end which extends outside the area defined by the adjacent paths of the first and second conveyors, wherein said at least one transfer element comprises two endless conveying elements, which extend substantially parallel to each other, with a predetermined spacing between them, in the path between the inlet end and the discharge end, and which transport the products, preferably clampingly, between them.

16. A buffer conveyor for conveying and buffering products, comprising:
at least a first elongated conveyor, which can be driven in a first direction and which has a first inlet end,
a second elongated conveyor, which can be driven in a second direction, opposite to the first direction and which has a first discharge end, which first and second conveyor at least partially extend in helical paths about one or more common vertical axes, at least substantially parallel to each other wherein the first conveyor includes a first inner radius and the second conveyor includes a second inner radius,
a transfer unit having a second inlet end and a second discharge end, which are movable at least substantially parallel to the first and the second conveyor in the aforesaid path, which transfer unit is provided with at least one drivable transfer element separate from the first and second elongated conveyors, the transfer element configured to transfer the products from the first conveyor to the second conveyor, so that the products can be transferred from the first inlet end of the first conveyor to the first discharge end of the second conveyor via the transfer unit, which transfer unit comprises a drive unit configured to move the transfer unit along the paths of the respective conveyors with its ends, preferably in dependence on the speeds of the first and the second conveyor, wherein said at least one transfer element of the transfer unit describes a path between the second inlet end and the second outlet end which extends outside the area defined by the adjacent paths of the first and second conveyors, wherein the path of the transfer element extends substantially rectilinearly on the helical paths.

17. A buffer conveyor for conveying and buffering products, comprising:
at least a first elongated conveyor, which can be driven in a first arced path in a first direction and which has a first inlet end,
a second elongated conveyor, which can be driven in a second direction that is opposite the first direction in a second arced path having the same diameter, and which has a first discharge end,
a transfer unit having a second inlet end and a second discharge end, which are movable at least substantially parallel to the first and the second conveyor in the aforesaid path, which transfer unit is provided with at least one drivable transfer element separate from the first and second elongated conveying members, the transfer element configured to transfer the products from the first conveyor to the second conveyor, so that the products can be transferred from the first inlet end of the first conveyor to the first discharge end of the second conveyor via the transfer unit, which transfer unit comprises a drive unit configured to move the transfer unit along the paths of the respective conveyors with its the second inlet end and the second outlet end, preferably in dependence on the speeds of the first and the second conveyor, wherein the second inlet end and the second outlet end of the transfer element of the transfer unit join the first and the second conveyor, respectively, from the inner radius of the arced paths, and in that the path of said at least one transfer element of the transfer-unit makes an angle smaller than the pitch angle of the first and the second conveyor between said second inlet end and said second outlet end.

18. A buffer conveyor according to claim 17, wherein at least one of said first and said second conveyor is disc-shaped.

19. A buffer conveyor according to claim 18, wherein the disc-shaped conveyor comprises at least one guide arranged for moving the products in radial direction on the disc-shaped conveyor.

* * * * *